US 11,405,791 B2

United States Patent
Changlani et al.

(10) Patent No.: US 11,405,791 B2
(45) Date of Patent: Aug. 2, 2022

(54) SYSTEM AND METHOD FOR OPTIMIZING A CHANNEL SWITCH MECHANISM BETWEEN DFS CHANNELS

(71) Applicant: HEWLETT PACKARD ENTERPRISE DEVELOPMENT LP, Houston, TX (US)

(72) Inventors: Nitin Changlani, Santa Clara, CA (US); Shahnawaz Siraj, Santa Clara, CA (US); Sachin Ganu, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 134 days.

(21) Appl. No.: 16/912,691

(22) Filed: Jun. 25, 2020

(65) Prior Publication Data

US 2021/0409961 A1    Dec. 30, 2021

(51) Int. Cl.
| | |
|---|---|
| H04W 4/00 | (2018.01) |
| H04W 16/14 | (2009.01) |
| H04W 84/12 | (2009.01) |
| H04W 48/16 | (2009.01) |
| H04W 24/02 | (2009.01) |
| H04K 3/00 | (2006.01) |
| G01S 7/02 | (2006.01) |

(52) U.S. Cl.
CPC ............ *H04W 16/14* (2013.01); *G01S 7/021* (2013.01); *H04K 3/226* (2013.01); *H04K 3/822* (2013.01); *H04W 24/02* (2013.01); *H04W 48/16* (2013.01); *H04W 84/12* (2013.01)

(58) Field of Classification Search
CPC ..... H04W 88/08; H04W 28/04; H04W 16/14; H04W 24/02; H04W 72/04; H04W 72/042; H04W 48/16; H04W 84/12; H04K 3/226; H04K 3/822; G01S 7/021
USPC ........................................................ 370/329
See application file for complete search history.

(56) References Cited

U.S. PATENT DOCUMENTS

| | | | |
|---|---|---|---|
| 2018/0020453 A1* | 1/2018 | Lin ..................... | H04W 4/021 |
| 2019/0182738 A1* | 6/2019 | Casebolt ............... | H04W 36/18 |
| 2021/0099889 A1* | 4/2021 | Johnson ............ | H04W 72/0453 |

* cited by examiner

*Primary Examiner* — Temica M Beamer
(74) *Attorney, Agent, or Firm* — Sheppard Mullin Richter & Hampton LLP

(57) ABSTRACT

Systems and methods are provided for optimizing the channel switching process in an access point. Periodic background scanning of a current channel on which a radio is operating to determine channel utilization can be used to generate a ranked channel list from which to select an alternative channel to which the radio can migrate, for example, in the event of a radar signal(s) being detected on its current channel. To maintain connectivity for clients, the clients may be temporarily transitioned to a non-DFS channel while an isolated/dedicated radio chain is used to perform the requisite Channel Availability Check (CAC) assessment on a DFS channel if the radio, based on the ranked channel list, selects a DFS channel as the alternative channel.

20 Claims, 9 Drawing Sheets

Computing Component 400

Hardware Processor 402

Machine-Readable Storage Medium 404

Determine if a channel switch from a current channel on which a radio is parked to an alternative channel is required
406

In response to a determination that a channel switch is required, determine a type of alternative channel to which the radio is to be switched
408

In response to a determination that the type of alternative channel is a dynamic frequency selection (DFS) channel, convert the AP to a multi-radio mode of operation including an isolated radio chain
410

Scan the alternative channel using the isolated chain of the radio to detect if radar signals present thereon
412

Transition the radio to the alternative channel if no radar signals are detected
414

FIG. 4

SYSTEM AND METHOD FOR OPTIMIZING A CHANNEL SWITCH MECHANISM BETWEEN DFS CHANNELS

DESCRIPTION OF RELATED ART

Wireless digital networks are becoming ubiquitous in enterprises, providing secure and cost-effective access to resources. Those networks usually have one or more controllers, each controller supporting a plurality of access points (AP) deployed through the enterprise. Wi-Fi networks operating in accordance with IEEE 802.11 standards are examples of such networks. Wireless network communications devices (also referred to as stations or client devices), such as personal computers and mobile phones transmit data across wireless digital networks vis-à-vis Wi-Fi APs, and cellular network APs, for example.

Wireless local area network (WLAN) infrastructure elements or components in a Wi-Fi network provide service to WLAN devices. In providing this service, radio frequency (RF) characteristics of the links between the AP and client devices may be determined in order to optimize the transmission and/or receipt of data. These RF characteristics can include, for example, path loss and channel coefficients.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is a block diagram of an example computing component or device for optimizing channel switching between Dynamic Frequency Selection channels in accordance with one embodiment.

Figure 1:
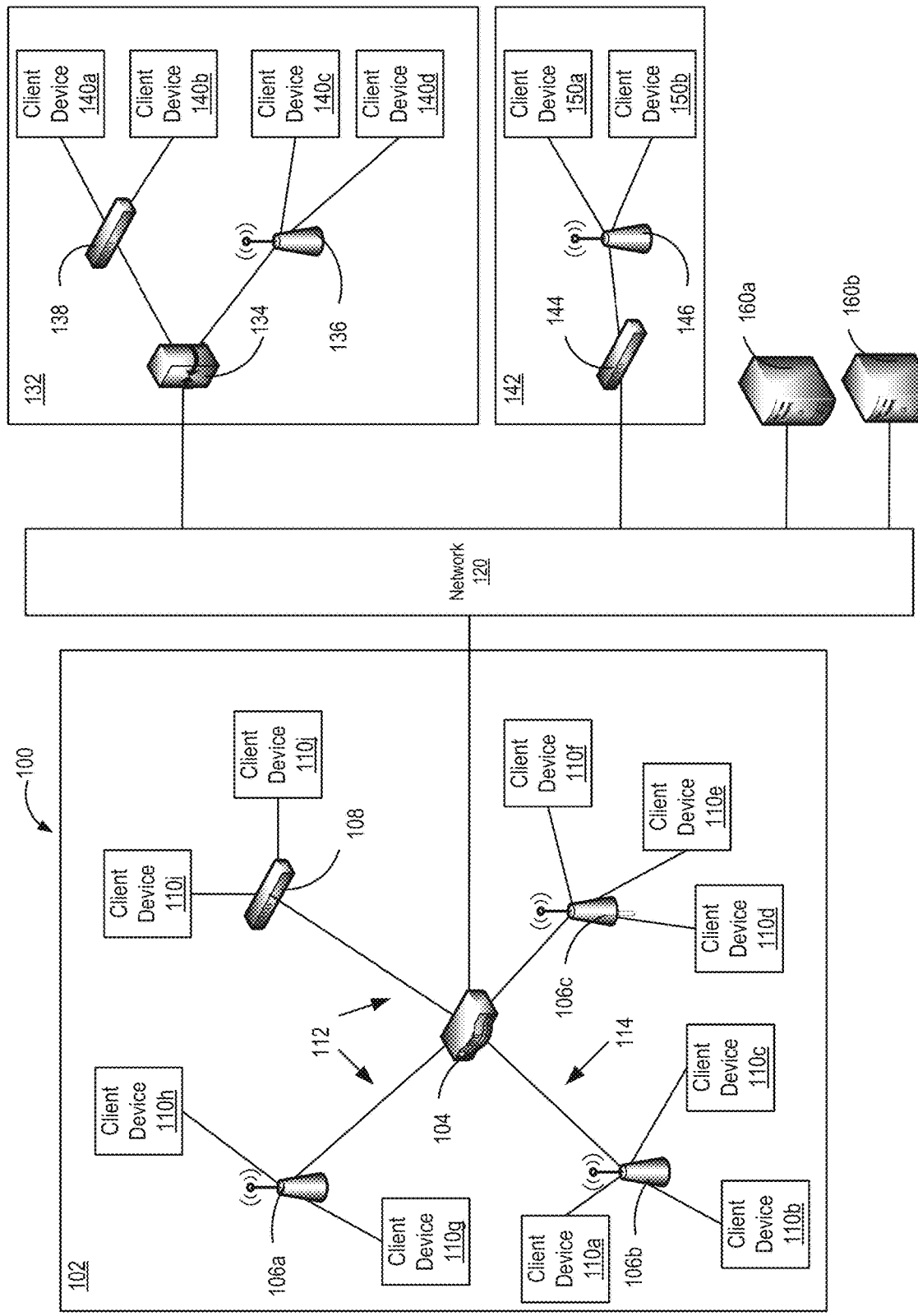
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Recently developed access points (APs) may comprise dual-band simultaneous radios that can operate with eight radio chains in the 5 GHz band and four radio chains in the 2.4 GHz band. At runtime, the 5 GHz radio can be converted into two logical radios each operating with four radio chains. One of these radio chains can be dedicated to scanning a destination channel. This also allows to comport with the Channel Availability Check (CAC) in case the destination channel is a Dynamic Frequency Selection (DFS) channel in the 5 GHz band, which refers to a period of time during which an AP will monitor signals for the presence of radar.

Currently, when a radio is set to operate on a DFS channel, and radar is detected, the radio will advertise a Channel Switch Announcement (CSA) information element (IE) as part of its next beacon frame (or some number of next beacon frames). The CSA IE informs its clients of a new channel to which the radio will be migrating. If the new channel is another DFS channel, CAC procedures must be followed (during which time, the radio is to be set to operate on the new channel to detect radar presence without beaconing).

Because a CAC assessment cannot be performed beforehand (per different regulations from different countries, e.g., Federal Communications Commission (FCC) regulations in the US), and because detection of a radar signal cannot be predicted, the time of completion of a CAC assessment cannot be predicted. Consequently, transitioning from one DFS channel to another DFS channel incurs a loss of connectivity on the AP's radio for the clients for some amount of time. In some embodiments, when a home channel of a radio is a DFS channel, periodic scans are performed such that the output provides a ranked list of desirable channels derived from both DFS and non-DFS channel subsets that can be selected as a new, target channel on which the radio can park/be set to operate.

Channel switching can be prompted by (again) detection of radar or when channel utilization is beyond acceptable limits. In the latter scenario, if an alternative channel is a DFS channel that has better (lower) utilization than the current home channel, the radio should attempt to transition to that new channel (pending a CAC assessment before the channel switch is initiated by advertising the CSA IE in beacon frames on the current home channel). If an alternative channel is a non-DFS channel that has better (lower) utilization than the current home channel, the radio should transition to that new channel (without the need for a CAC assessment).

When a channel switch has been initiated due to utilization worsening on a current home channel and the next desirable (alternative) channel is a DFS channel, the radio will (a) transition into 7+1 (single 5 GHz radio) mode or 4+3+1 (dual 5 GHz radio) mode, and (b) the dedicated/ isolated chain (1) can begin scanning the next desirable channel for the requisite CAC time. If no radar is detected, the radio can (c) announce the CSA IE in its beacons and then transition to that new channel. If radar is detected during the CAC-compliant scan time, the radio (d) abandons the scan on the alternative channel and scans another channel in accordance with desirability ranking. It should be noted that embodiments of the present disclosure are not necessarily limited to multi-radio modes such as 7+1 or 4+3+1 modes. For example, some contemplated embodiments may comprise isolating more than a single radio chain, where the multiple isolated radio chains may be set to operate on the same channel. In this way, receive-sensitivity on the scanned channel can be improved. In general, a radio can be split into any number of radio chains that in sum, equal that of the original radio.

When a channel switch has been initiated due to the detection of a radar signal(s) on the current home channel, and the next desirable channel is a DFS channel, the radio can (a) switch to the highest-ranked non-DFS channel from the ranked channel list by (b) advertising the CSA IE to its clients. This is a temporary switch meant to allow the radio to go into 7+1 or 4+3+1 mode and start scanning the DFS channel (the original next desirable channel) for the requisite CAC time. If no radar is detected, the radio can (c) announce CSA IE in its beacons and transition to the new DFS channel. If radar is detected during the CAC-compliant scan time, the radio (d) abandons the scan and checks the next-ranked channel from the list. If the next-ranked channel is a non-DFS channel, the radio may consider this to be its new home channel. If the next-ranked channel is a DFS channel, the radio can move the isolated radio chain to this new (DFS) channel, restart the CAC time, and repeat the process.

It should be understood that DFS refers to a section of the Institute of Electrical and Electronics Engineers (IEEE) 802.11h standard that sets forth a channel allocation scheme that can be used in a WLAN. In particular, DFS allows unlicensed Wi-Fi devices to operate in the 5 GHz frequency bands by sharing those 5 GHz frequency bands with radar systems. The 5 GHz band is divided into several sections referred to as Unlicensed information infrastructure (UNII), each being designated for a particular use/operation, such as indoor/outdoor operations. DFS is designed to prevent interference with other usages of the C band frequency band (e.g., military radar, satellite communication, and weather radar). Depending on the regulatory domain, certain channels in the 5 GHz band can be used by radar devices.

It should be noted that according to the 802.11 standard, a service set or extended service set (ESS) can refer to a group of wireless network devices that are identified by the same service set identifier (SSID) or "network name." A BSS can refer to a subgroup of devices with a service set that (in addition to operating on the same level 2 networking parameters to form a logical network) operate within the same physical layer medium access characteristics, e.g., RF, modulation scheme, security settings, etc. such that they are wirelessly networked. Thus, in an enterprise WLAN network, multiple BSSs can be controlled such that network devices can be clustered in different BSS networks.

Also, certain APs can be converted or configured to operate according to dual- or tri-radio modes. For example, an AP may be configured to operate using logical or physical radios. e.g., a 2.4 GHz radio and two 5 GHz radios. That is, a network device, such as an AP can use a radio chain to transmit and/or receive information via a network. As used herein, the term "radio chain" can refer to hardware that can transmit and/or receive information via radio signals. Wireless client devices and/or other wireless devices can communicate with a network device on a communication channel using multiple radio chains. As used herein, the term "communication channel" (or channel) can refer to a frequency or frequency range utilized by a network device to communicate (e.g., transmit and/or receive) information. A multiple input multiple output (MIMO) network device can use multiple radio chains to transmit and/or receive information. A radio chain can include two antennas such as a horizontal antenna and a vertical antenna, among other possibilities. As used herein, the term "antenna" refers to a device that converts electric power into radio waves, and/or vice versa.

In this way, client connectivity is not interrupted when detecting radar on a current DFS channel, and in response to wanting to switch to another DFS channel. Client connectivity is not interrupted even if radar is detected on the new DFS channel. Moreover, a CAC assessment for a new DFS channel can be performed in full conformance with country-specific regulations (e.g., FCC regulations). Further still, the available radio chains for a radio's BSS operations are not permanently limited. It should be understood that BSS operations can encompass transmissions/reception of data and non-data frames between an AP and its clients performed using the radio chain(s) on the AP and client.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2A:
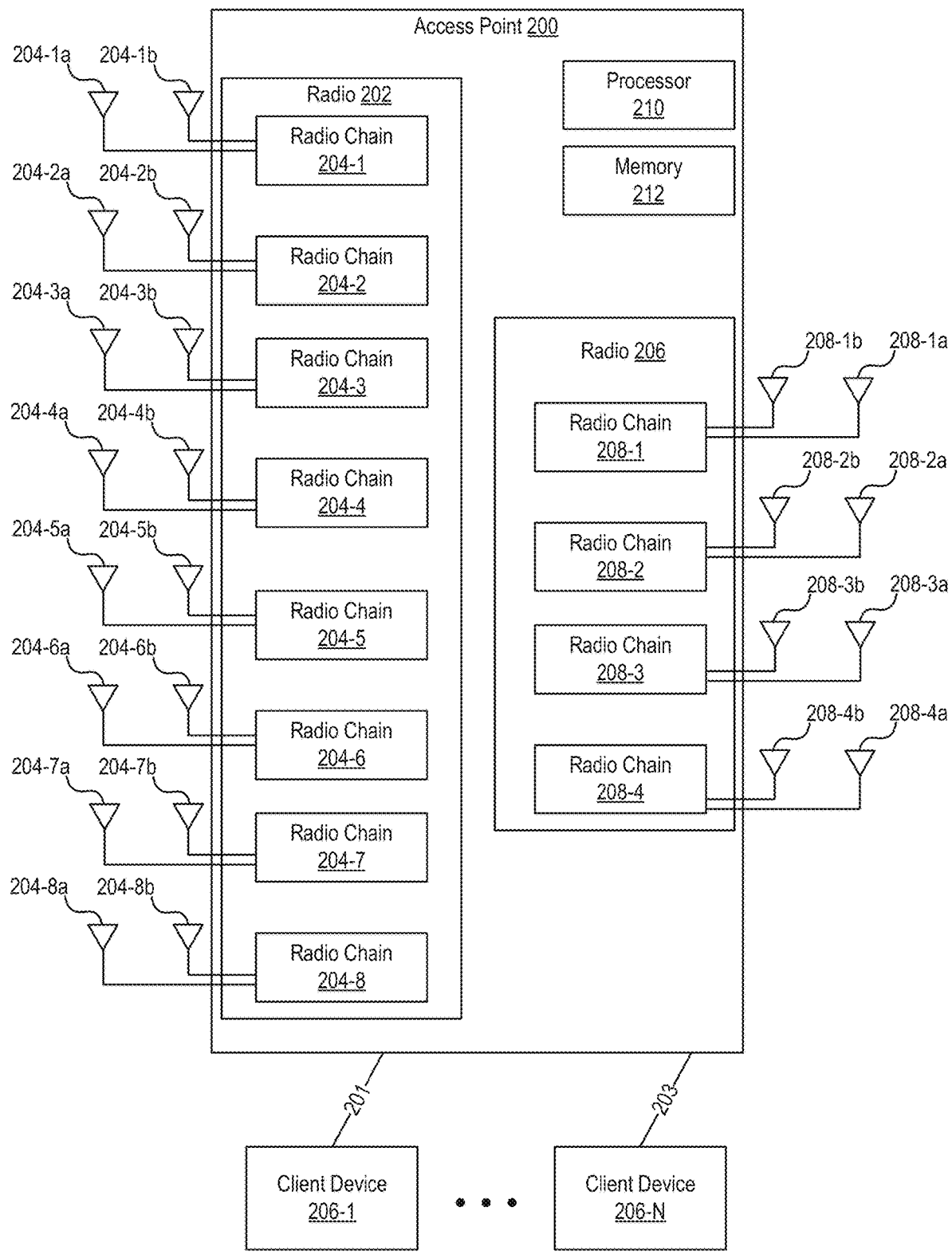
FIG. 2A illustrates an example access point within which various embodiments may be implemented.

FIG. 2A illustrates an example AP 200, which may be an embodiment of one of the APs of FIG. 1 (e.g., APs 106a-c). An AP can refer to a networking device that allows a wireless client device to connect to a wired or wireless network, and need not necessarily be limited to IEEE 802.11-based APs. An AP can include a processing resource, e.g., processor 210, a memory, e.g., memory 212, and/or input/output interfaces (not shown), including wired network interfaces such as IEEE 802.3 Ethernet interfaces, as well as wireless network interfaces such as IEEE 802.11 Wi-Fi interfaces, although examples of the disclosure are not limited to such interfaces.

AP 200 can include a plurality of antennas. AP 200 can include a radio 202 which may be a 5 GHz radio including eight radio chains, 204-1, 204-2, 204-3, 204-4 . . . , 204-8. Each radio chain includes two antennas (204-1a, 204-1b. 204-2a, 204-2b, 204-3a, 204-3b, 204-4a, 204-4b . . . , 204-8a, 204-8b). For instance, each radio chain can include a horizontal antenna and a vertical antenna, among other possibilities. Each radio chain is available for both transmitting and receiving data. It should be understood that examples of the present disclosure are not so limited. AP 200 may further include another radio 206, which may be a 2.4 GHz radio including four radio chains, 208-1, 208-2, 208-3, 208-4. Similar to the radio chains 204-1 . . . 204-8, each of radio chains 208-1 . . . , 208-4 may include two (vertical and horizontal) antennas (208-1a, 208-1b . . . , 208-4a, 208-4b). Although not shown in FIG. 2A for clarity and so as not to obscure examples of the present disclosure, each of the radio chains can be connected to the plurality of antennas via a RF switch.

Figure 2B:
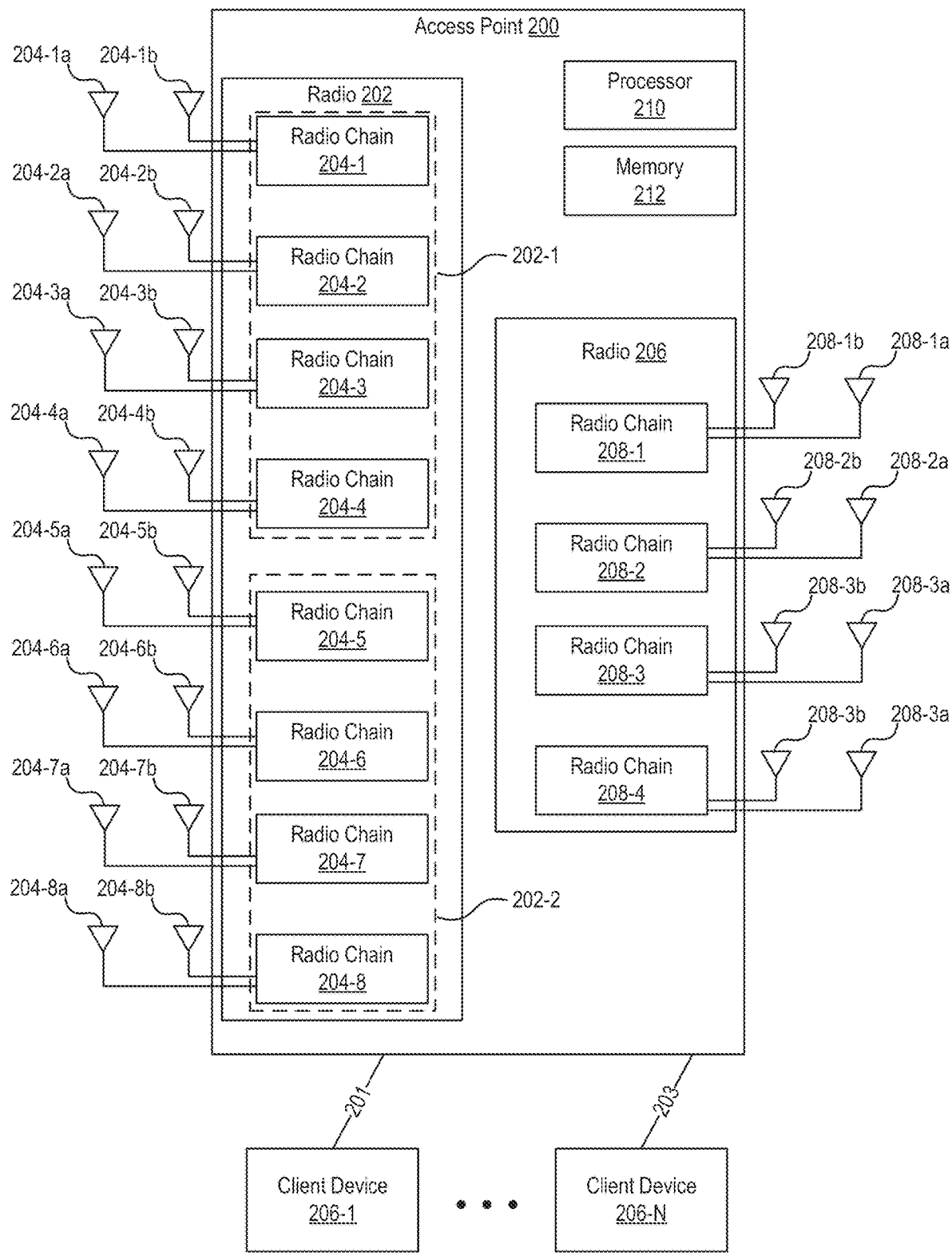
FIG. 2B illustrates a multi-radio configuration of the example access point of FIG. 2A.

In some examples, as illustrated in FIG. 2B, the eight radio chain 5 GHz radio, i.e., radio 202, may be converted at runtime, into two radios (202-1 and 202-2) operating simultaneously with four radio chains each (204-1 to 204-4, and 204-5 to 204-8). Thus, AP 200 may operate using simultaneous tri-radio operations, i.e., two 5 GHz radios (radio 202 partitioned into radios 202-1 and 202-2, and a single 2.4 GHz radio, i.e., radio 206). For example, radio 202-1 can be dedicated to a first communication channel 201 in a first communication channel group, and radio 202-2 can be dedicated to a second communication channel 203 in a second communication channel group.

Figure 2C:
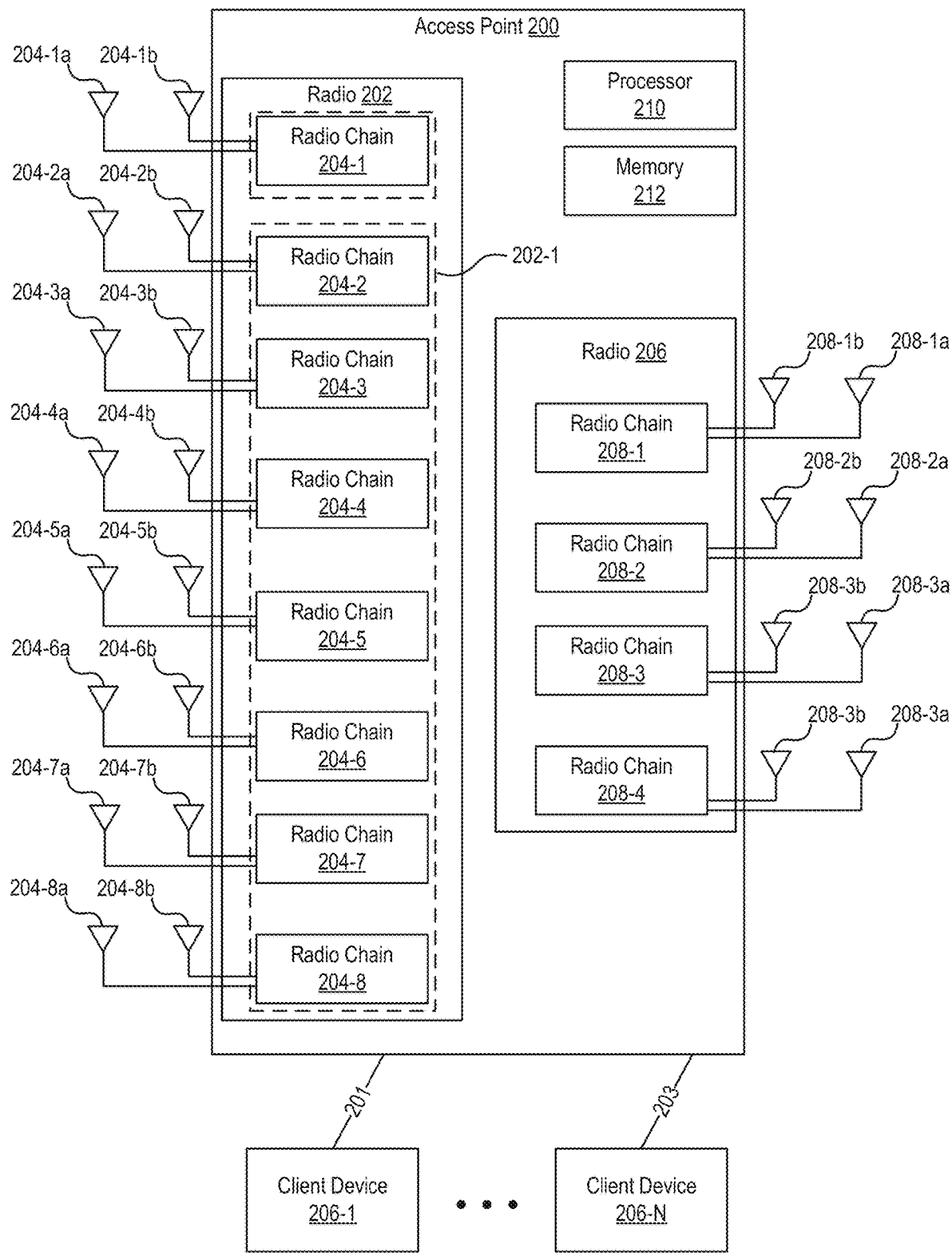
FIG. 2C illustrates the example access point of FIG. 2A with an isolated radio chain according to one embodiment.
Figure 2D:
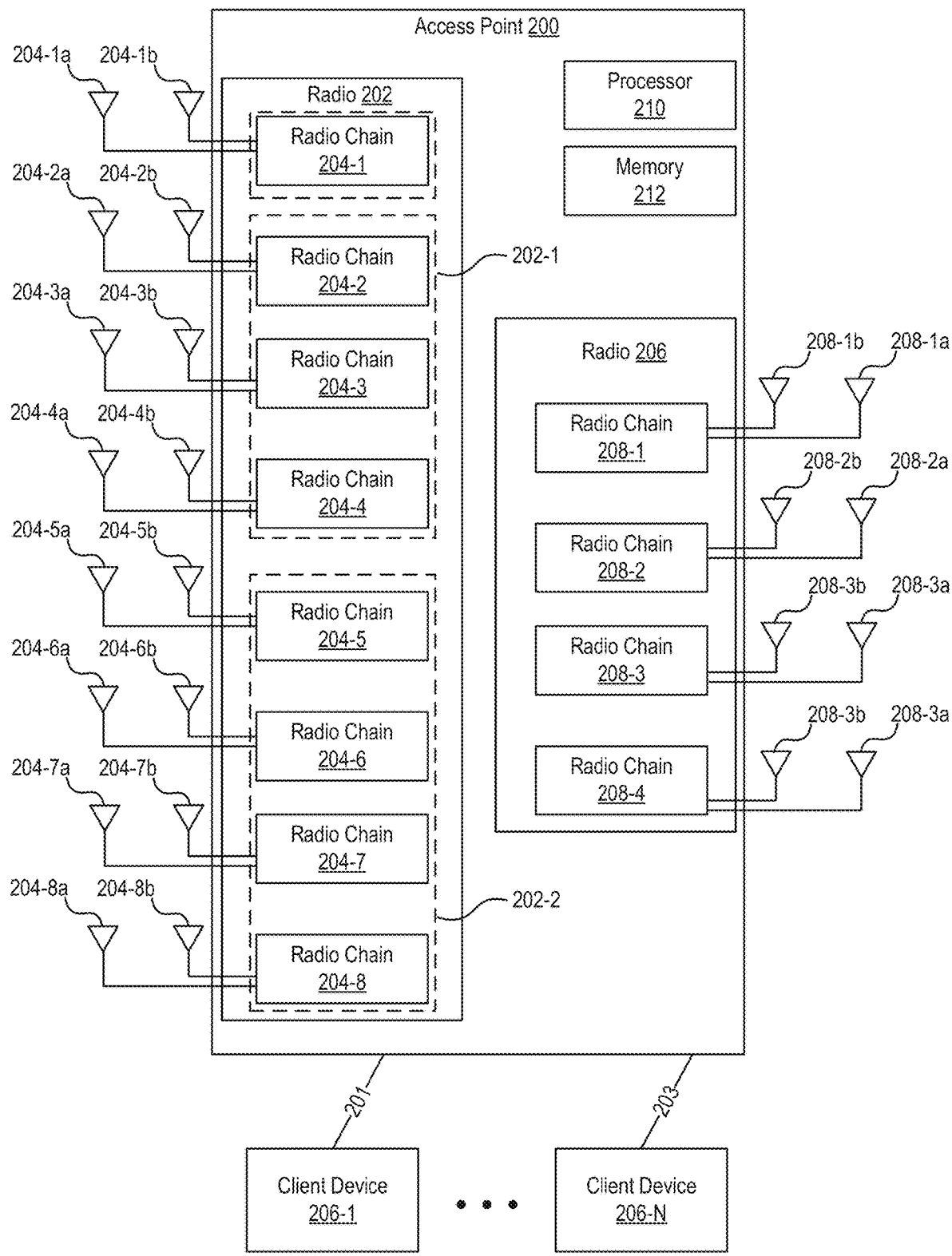
FIG. 2D illustrates the multi-radio configuration of the example access point of FIG. 2A with the isolated radio chain according to another embodiment.

In accordance with various embodiments, whether AP 200 is operating using radio 202 as a single radio or as two radios 202-1 and 202-2, one of the radio chains can be isolated and used for scanning on a different channel (as will be described in greater detail below). That is, AP 200 may operate in a 7+1 mode, where seven of the eight radio chains are used for BSS operations, and the remaining radio chain is used for scanning on a different channel. For example, referring to FIG. 2C, radio chain 204-1 may be isolated and dedicated for scanning on a different channel, leaving radio chains 204-2, 204-3 . . . , 204-8 for use with BSS operations. Thus, AP 200 may be said to operate in a 7+1 mode. For example, referring to FIG. 2D, radio chain 204-1 may be isolated and dedicated for scanning on a different channel. Thus, radio 202-1 can be used for BSS operations using radio chains 204-2, 204-3, and 204-4, and radio 202-2 can be used for BSS operations using radio chains 204-5, 204-6, 204-7, and 204-8. Thus, AP 200 may be said to operate in a 4+3+1 mode.

As mentioned, in some examples the communication band can be a 5.0 GHz UNII band. Communication channels (and mid-point frequencies) operating on the 5 GHz communication band can include 36 (5.180 GHz), 40 (5.200 GHz) 44 (5.220 GHz), and 149 (5.745 GHz), among others. In such examples, AP 200 can provide network connectivity to wireless client devices 206-1 on communication channel 201 (e.g., communication channel 36) included in a first communication channel group that is different from another communication channel 203 (e.g., communication channel 44) included in a second communication channel group that provides network connectivity to a different wireless client device such as wireless client device 206-N. That is, communication channel 201 is a communication channel that is different from communication channel 203. While illustrated as an individual communication channel it is understood that the first communication channel group and/or the second communication channel group can include a plurality of communication channels.

In some examples, the first communication channel group can include a plurality of communication channels with each communication channel of the plurality of communication channels is to operate on a communication band (e.g., 5.0 GHz UNII band) and operate in accordance with the particular wireless specification (e.g., 802.11ax). For example, by operating in accordance with the particular specification such as IEEE 802.11ax, each communication channel in the first communication channel group can employ OFDMA, spatial reuse, uplink multiuser multiple-input and multiple-output (UL MU-MIMO), and/or combinations thereof. By extension, a wireless client device having a capacity of complying with the particular wireless specification can, in such examples, have the capacity for employing OFDMA, spatial reuse, UL MU-MIMO, and/or combinations thereof.

In conventional networks, when a radio is set to operate on a DFS channel (D1), and radar is detected on channel D1 while performing normal BSS operations, the radio will advertise a CSA IE as part of its next beacon frame (or some finite number of subsequent beacon frames). This informs the client devices attached to the radio (of an AP) of a new channel to which the radio is migrating towards. If this new channel to which the radio is migrating happens to be another DFS channel (D2), a CAC assessment must be performed on channel D2. That is, the radio will park on channel D2, and monitor channel D2 for radar signals.

Here, a radar signal may refer to a burst of pulses of a high frequency signal. When one burst is over, another burst may repeat after a period of time, which is known as sweep time. The sweep time can be a result of radars that slowly rotate through 360 degrees, so that in a 30-second sweep period, the AP may receive the radar signal for a fraction of a second. During this short period, the AP may see a few pulses separated by a time interval (e.g., from 250 microseconds to 20 milliseconds), where each pulse may last 2 microseconds or smaller in width. A DFS-enabled AP can search for radar pulses in the frequency channel where it is operating or during a channel scan. Also, a DFS-enabled AP may constantly monitor errors in the received frames and analyze the timing patterns for periodicity for a pattern that matches a radar signal.

Operating an AP, such as AP 200 in either the 7+1 or 4+3+1 modes (and isolating/dedicating a single radio chain for scanning while operating the radio in 7×7 or 3×3 mode) helps mitigate the issue of having to perform CAC assessment on new channels. However, when a current channel is a DFS channel, and radar is detected on the current channel, service on that channel will halt pending migration to a new channel, which can only happen after a CAC assessment is performed (and radar is not found on that new channel). Thus, even though a single radio chain can be dedicated to scanning a new channel for the presence of radar, the cycle of performing CAC assessments and radar detection cannot be escaped. Dynamically putting an AP into 7+1 or 4+3+1 operating mode and performing CAC assessments with the isolated radio chain and "hoping" radar is detected so that it can know to seek out another channel to which it can migrate is not a repeatable solution, and has a low probability of success. Statically operating an AP in 7+1 or 4+3+1 mode, and continuously performing CAC assessments with the isolated chain would unreasonably limit the operation mode of the radio's BSS for DFS channels all the time, and thus, the maximum capabilities of the AP cannot be realized.

Accordingly, and as alluded to above, systems and methods of optimizing channel switching are disclosed herein, and these systems and methods involve a new channel selection mechanism, and a new manner of effectuating switching channels. Various embodiments disclosed herein can: (1) ensure that client connectivity is not interrupted when radar is detected on a current DFS channel, and a radio wants to switch to another DFS channel (even if radar is detected on the new DFS channel as well); and (2) CAC assessment for the new DFS channel is performed in full compliance with FCC regulations, and without permanently limiting the available radio chains for a radio's BSS operations.

It should be understood that in some network installations, the radio(s) of an AP, e.g., one of APs 1-6, 136, 146 (FIG. 1) or AP 200 (FIGS. 2A, 2B) may be configured to provide and maintain network connectivity over a first channel, referred to as its "home channel," with one or more client devices that are associated with the radio(s) and authenticated by the AP. Assignment of a home channel can be determined by a network-wide algorithm. At different prescribed times, an AP is configured to run in monitor mode to scan one or more other channels, referred to as its "foreign channels," to acquire state information from neighboring APs. An AP may attempt to sample channel utilization (derived from observed noise floor and interference on a channel) on all the channels that it has scanned. If the home-channel of a radio is a DFS channel and detects a radar signal on it, the radio will transition to the best available channel based on its own analysis, without the intervention of the home channel assignment algorithm. This process will also be followed if the channel utilization on the current home-channel deteriorates beyond an acceptable level (described below).

Thus, based on the above-described channel utilization sampling, a ranked list of channels to which a radio may migrate can be maintained by the AP. For example, such a ranked list may be stored and maintained in memory 212 of AP 200 (FIG. 2). In this way, a radio will be able to use a measured approach to channel selection and migration by being able to select a new channel based on recent performance/preference.

For example, if an AP (or more specifically, a radio of the AP) that is currently set to operate on a DFS channel senses radar on that DFS channel, it must migrate to a non-DFS channel. After some period of time, the AP may attempt to check to see if a DFS channel is available. If not, the AP must remain on the non-DFS channel. It should be noted that in the 5 GHz spectrum range, when channels are partitioned into 20 MHz bands, e.g., in the United States, n1 channels are designated non-DFS (in this case, nine), while n2 channels are DFS channels (in this case, 16). Forcing migration to a non-DFS channel reduces an AP's/radio's choices by 64%. In accordance with various embodiments, an AP may instead maintain a list of channels that includes both non-DFS and DFS channel possibilities ranked in order of preference, and upon determining a need to migrate to a new channel, may leverage that channel list to determine what new channel to attempt to migrate to. In the above example, if a preferred channel of the ranked channel list is a non-DFS channel, the radio/AP may simply migrate to that non-DFS channel.

Figure 3A:
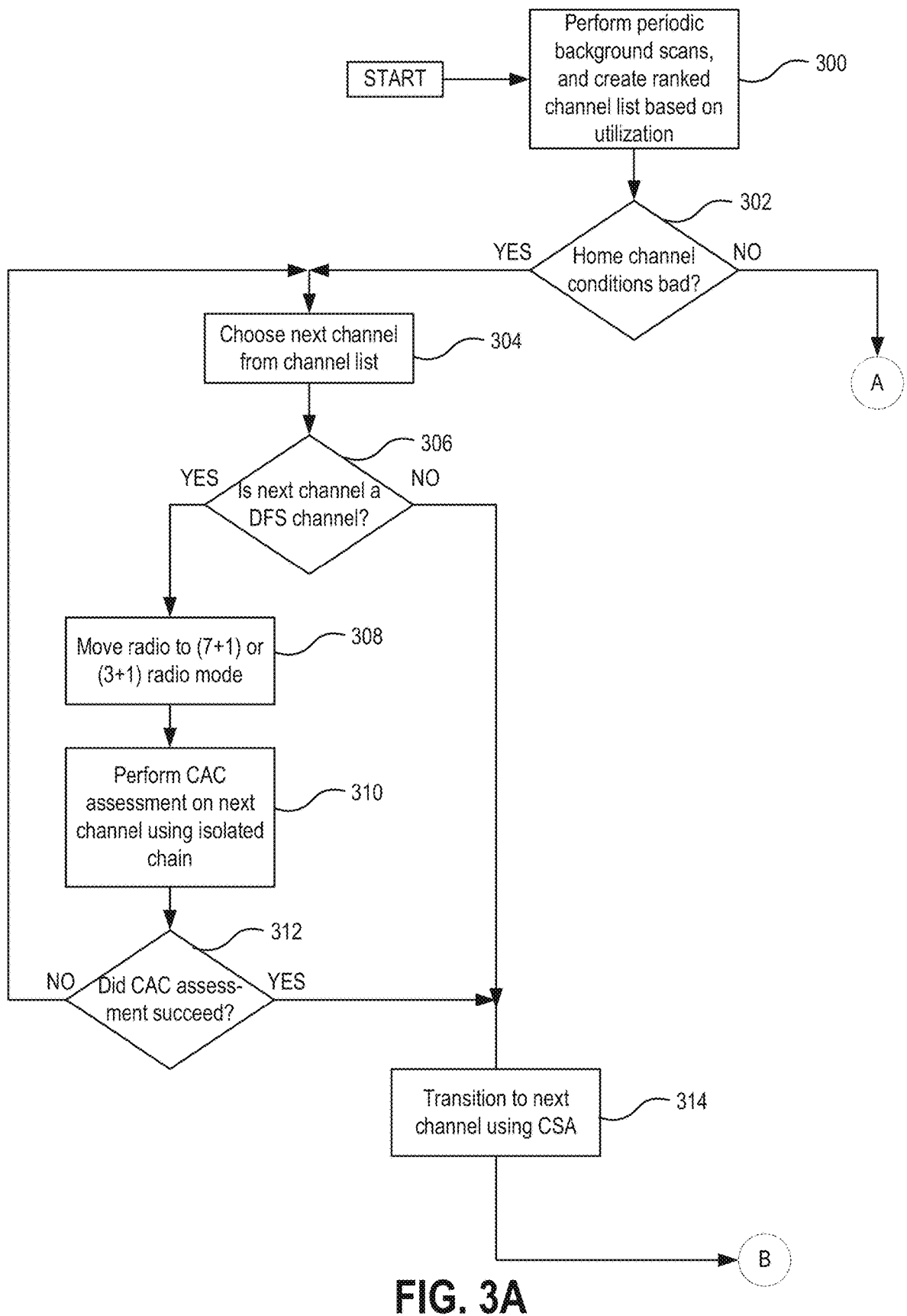
FIG. 3A is a flow chart illustrating example operations that may be performed to optimize channel switching between Dynamic Frequency Selection channels in accordance with one embodiment.
Figure 3B:
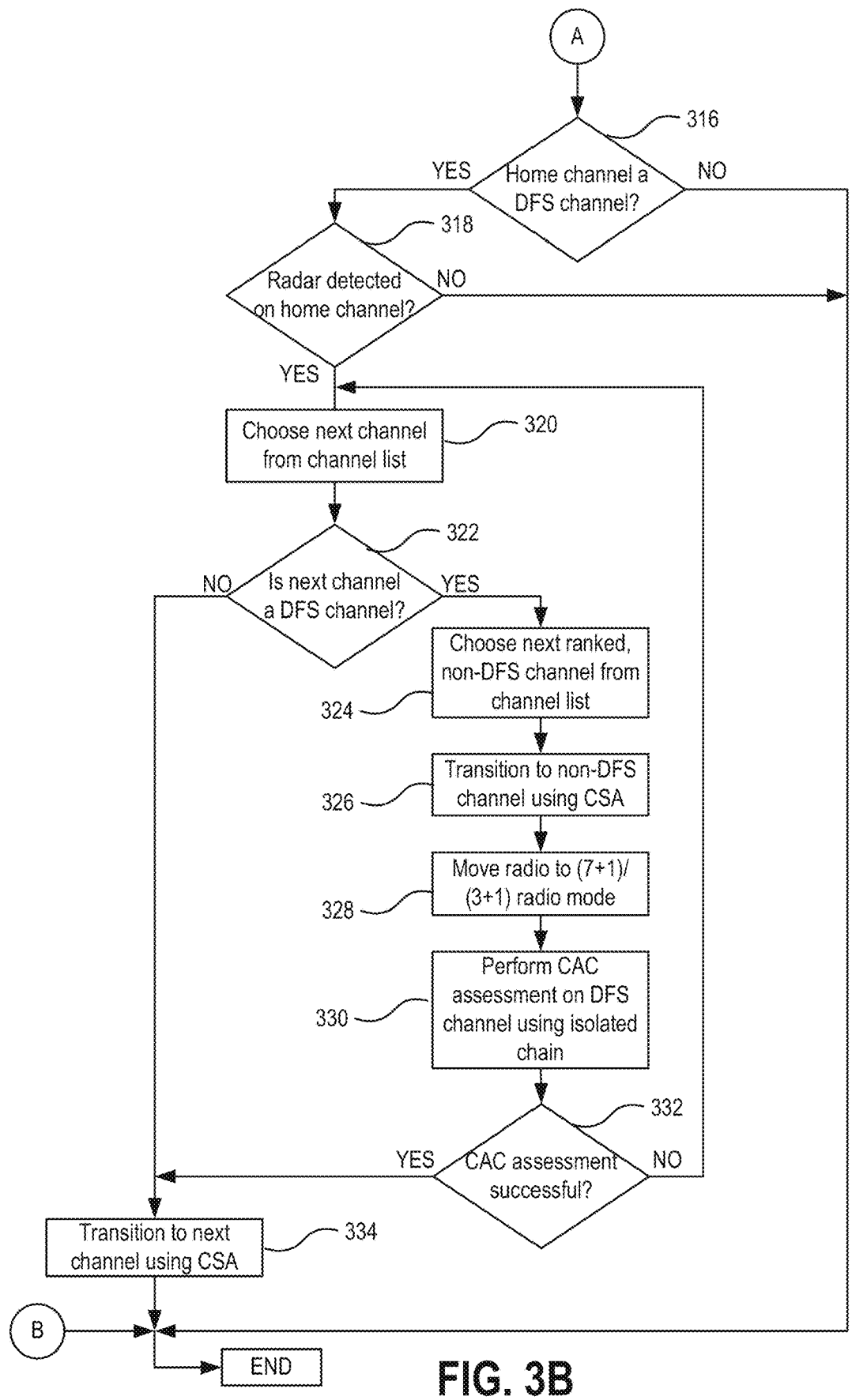
FIG. 3B is a continuation of the flow chart of FIG. 3A.

If, however, the preferred channel is a DFS channel, the following mechanism for channel switching described in conjunction with FIGS. 3A and 3B may be utilized. FIGS. 3A and 3B illustrate a flow chart comprising example operations that may be performed to effectuate optimal channel selection and switching in accordance with various embodiments.

At operation 300, periodic background scans of (foreign) channels may be performed to create a ranked channel list.

The channel list ranking can be based on utilization. It should be noted that the periodic scans are performed and the output is a ranked list of desirable channels derived from both DFS and non-DFS channel subsets {C1 . . . Cn}. This provides alternate channels that a radio can select in accordance with the channel switching mechanism described below. That is, periodic scanning results in a list of BSS that are discovered in the neighborhood across the channels that are scanned. These results can be ordered from most favorable to least favorable based on utilization (e.g., noise-floor, interference, etc.).

At operation 302, a check can be performed to determine if the conditions on a radio's home channel are bad, e.g., high noise floor and/or high interference are experienced on the home channel. It should be noted that the home channel on which a radio is operating can be scanned during regular operations as well, and does not need to be a part of the aforementioned background scanning. It should also be noted that "bad" home channel conditions can vary depending on the clients supported by an AP, the network on which the AP is operating, desired quality of services, etc., and generally suggest some undesirable condition(s) based on a network perspective, user perspective, or both. Thus, home channel conditions can be compared to, e.g., determined thresholds regarding utilization of the home channel.

If conditions are determined to be bad, at operation 304, the AP selects a next channel (C1) to which the radio can attempt to migrate. The next channel, C1, may be the highest-ranked channel choice in the above-mentioned ranked channel list maintained by the AP. As noted above, the AP may perform periodic background scans to determine channel utilization. Accordingly, the ranked channel list can be periodically updated to reflect currently-preferred non-DFS and DFS channels. For example during a first periodic background scan, a particular channel may be over-utilized making it less preferable than another, less-utilized channel. However, during a second periodic background scan, the previously-over-utilized channel may have become less utilized, moving it ahead in the ranked channel list.

At operation 306, a check is performed to determine if this next channel C1, is a DFS channel. If not, the AP may instruct the radio to simply transition/migrate to the next channel C1. Because it is a non-DFS channel, no CAC assessment is needed. That is, radar does not use a non-DFS channel, and so the radio may immediately migrate to the next channel C1. Accordingly, the radio may transmit a CSA IE in subsequent beacons to its clients informing those clients of the next channel C1 with which they should associate.

However, if the next channel C1 is a DFS channel, at operation 308, the AP may convert radio operation of its 5 GHz radio to 7+1 or to 4+3+1 mode, if not already operating in one of those multi-radio modes. As noted above, operating in these modes allows a single radio chain to be dedicated to scanning a different channel, allowing client devices already associated with the AP/radio to continue receiving service/maintain connectivity. In this case, because the next channel C1 to which the radio wishes to migrate is DFS channel, per FCC regulations, a CAC assessment must be performed to determine if radar is present on that next channel C1. For example, the AP may have to camp/park on the next channel C1 for, e.g., one to 10 minutes depending on the relevant rules) to wait and see if a radar signal(s) is/are detected. If a radar signal(s) is/are detected, the radio cannot use that channel for the CAC duration, and must attempt to migrate to another channel. Accordingly, at operation 310, a CAC assessment is performed by the AP on the next channel C1 using the "+1" radio, i.e., the single radio of the 8×8 5 GHz radio or a single radio from one of the two 4×4 5 GHz radios At operation 312, a check is performed to see if the CAC assessment was successful. That is, if no radar was detected on the next channel C1, the radio can transition to using the next channel C1 by sending a beacon(s) to its clients containing a CSA IE informing those clients of the next channel C1 to which they should associate. However, if radar signals were detected on the next channel C1 at operation 312, the process returns to operation 304, where the next preferred channel in the ranked channel list is chosen, which now comprises channels {C2 . . . Cn}. Operations 306-312 may be performed again to determine if the radio can migrate to the next channel C2. That is, the isolated radio moves to the next channel C2, a CAC time/timer is reset, and the isolated radio can remain on the next channel C2 for the prescribed amount of time to determine if any radar signal(s) is/are detected on the next channel C2.

If, however, a radio is prompted to switch channels due to the detection of at least one radar signal on the radio's home channel C, a different set of operations may be performed (corresponding to FIG. 3B). At operation 316, following a determination that the current channel conditions on home channel C are acceptable, a check is performed to determine if the home channel C is a DFS channel. Again, certain channels (depending on location/regulation) may be designated to be DFS channels. It should be understood that an AP is aware of what channel a radio may be using. Whether a channel is a DFS or non-DFS channel is known beforehand based on the allocation of frequencies by regulatory bodies such as the FCC.

If the home channel C is not a DFS channel, the radio may simply remain on the home channel C. Again, the previous check at operation 304 to determine whether the radio's home channel condition are bad resulted in a determination that the home channel conditions were not bad. Radar is not supposed to be used on non-DFS channels, and so there is not yet any reason to migrate to another channel.

On the other hand, if at operation 316, it was determined that the radio's home channel C is a DFS channel, the process continues to operation 318, where a check for radar can be performed. It should be understood that a CAC assessment refers to a particular procedure performed before using a DFS channel during which a radio monitors the DFS channel to see if radar is detected thereon. This CAC assessment is typically performed for a finite amount of time (as noted above). Therefore, at a later point in time, a radar signal(s) may still be detected. It is this radar detection that is being performed at operation 316 (as opposed to a CAC assessment). If no radar signal(s) is/are detected on the home channel C, again, the radio may simply remain on its home channel C, as there is not yet any need for the radio to switch channels.

If a radar signal(s) is/are detected on home channel C, the AP selects a next channel from the ranked channel list at operation 320.

At operation 322, a check may be performed to determine if this next channel is a DFS channel. If not, the process may progress to operation 334, where the radio can transition to the next channel by including a CSA IE in its beacon(s) to inform clients associated with the radio to migrate to the next channel. However, if the next channel does happen to be another DFS channel, at operation 324, the next non-DFS channel in the ranked channel list may be selected for migration of the radio.

Thus, at operation 326, the radio transitions to the next non-DFS channel by beaconing a CSA IE regarding the next non-DFS channel to its associated clients so those clients may begin using this channel for BSS operations. At this point, clients may maintain connectivity, and there is no need to wait while the AP/radio performs a CAC assessment of the channel.

At operation 328, like operation 308 (FIG. 3A), the AP may convert radio operation of its 5 GHz radio to 7+1 or to 4+3+1 mode, if not already operating in one of those multi-radio modes. As noted above, operating in these modes allows a single radio chain to be dedicated to scanning a different channel, allowing client devices already associated with the AP/radio to continue receiving service/maintain connectivity. In this case, because the next channel to which the radio wishes to migrate is a DFS channel, per FCC regulations, a CAC assessment must be performed to determine if radar is present on that next channel.

At operation 330, like operation 310 (FIG. 3A), a CAC assessment may be performed on the next-ranked channel, which as described above, is a DFS channel. The CAC assessment, because the AP is operating in multi-radio mode (either 7+1 or 4+3+1), a single radio chain can be isolated/dedicated to camping on the next channel, and waiting, for the requisite amount of time, to determine if a radar signal(s) exists on the next channel. In this way, the clients (as described above) can maintain connectivity on a non-DFS channel, meaning the clients can continue using the next ranked non-DFS channel without having to halt BSS operations due to CAC assessments or migrate to another channel. At the same time, the more preferable channel (based on utilization), i.e., the next-ranked DFS channel, can be assessed in terms of radar presence.

If, at operation 332, it is determined that the CAC assessment on the next-ranked DFS channel was successful, i.e., no radar was detected during the requisite amount of time the radio had to park and wait, the radio can transition to that next-ranked DFS channel. That is, the radio can send in its subsequent beacon(s), a CSA IE regarding the next-ranked DFS channel so that its clients can transition to that next-ranked DFS channel, leaving the non-DFS channel. If the CAC assessment performed at operation 332 was not successful, i.e., at least one radar signal was detected on the next-ranked DFS channel, the process may return to operation 320, where the next channel in the ranked channel list can be selected, and operations 322 and 334, or operations 322-334 can be repeated as necessary (which includes move the isolated radio chain to the channel to be assessed (CAC), and restart the CAC time. It should be noted that in the latter scenario, the clients can remain on non-DFS channel, and can continue to have network connectivity while searching for another DFS channel to which they can migrate. It should be understood that the non-DFS channel (as the radio's current channel) can be considered the radio's new home channel. It should also be understood that during the operations illustrated in FIG. 3A (and described above), a radio may still detect the existence of radar on a channel, in which case, the operations illustrated in FIG. 3B (also described above) can be triggered.

As noted above, because there are 25 channels in the 5 GHz frequency range (for 20 MHz channels), and 16 of those 25 are designated DFS channels versus nine non-DFS channels of the 25 total channels (at least in the United States), the number of channels to which a radio can migrate has increased by approximately 1.5×. That is, the channel to which a radio can migrate may potentially be any of the 25 channels in the 5 GHz frequency range, rather than being limited to only the non-DFS channels, i.e., channel diversity increases. Without such a mechanism, a conventional network, even if the APs in that conventional network have the ability to operate in a multi-radio mode, could only migrate to a non-DFS channel if the CAC assessment/radar detection cycle is to be avoided. Otherwise, if a radio detected radar on its current channel (if it happens to be a DFS channel), and it were to attempt to migrate to a new DFS channel, the clients would lose connectivity while a CAC assessment is performed on that new DFS channel. Hence, the conventional preference to migrate to a non-DFS channel, which again, are limited in number. Here, non-DFS channels, if need be, are typically only temporarily used to maintain client connectivity, while searching for a new DFS channel (if preferable based on utilization) to which a radio can migrate.

FIG. 4 is a block diagram of an example computing component or device 600 for separating radio chains between mission-critical devices and enterprise clients in accordance with one embodiment. Computing component 400 may be, for example, a server computer, a controller, or any other similar computing component capable of processing data. In the example implementation of FIG. 4, the computing component 400 includes a hardware processor, 402, and machine-readable storage medium, 404. In some embodiments, computing component 400 may be an embodiment of an AP processor or AP controller, e.g., processor 210 of AP 200, for example. More particularly, computing component 400 may be a component of a central entity such as wireless mobility controller in the network.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EE-PROM), a storage device, an optical disc, and the like. In some embodiments, machine-readable storage medium 402 may be a non-transitory storage medium, where the term "non-transitory" does not encompass transitory propagating signals. As described in detail below, machine-readable storage medium 402 may be encoded with executable instructions, for example, instructions 406-414.

Hardware processor 402 may execute instruction 406 to determine if a channel switch from a current home channel on which a radio is set to operate to an alternative channel is required. As described above, various embodiments key off bad channel conditions based on, e.g., high noise floor/low signal to noise ratio, and high interference. In some scenarios, a channel switch may be necessary if a radar signal(s) is/are detected on the channel, if that channel is a DFS channel.

Hardware processor 402 may execute instruction 408 to determine a type of alternative channel to which the radio is to be switched in response to a determination that the channel switch is required. As noted above, a ranked channel list can be created and maintained based on periodic background scans of channels to determine utilization of channels upon which the ranking of channels in the ranked channel list can be based. Based on the ranking, and because the ranked channel list includes both DFS and non-DFS channels (to increase channel diversity), a determination is made as to whether the channel selected by the radio in accordance with the ranked channel list is a DFS channel or not. If not, the radio can simply migrate to that new, non-DFS channel.

However, if the selected channel is a DFS channel, hardware processor 402 may execute instruction 410 to convert the AP to operating in a multi-radio mode of operation that includes an isolated radio chain. As described above, the isolated radio chain can be used to scan a different channel to perform a CAC assessment. In this way, clients associated with that radio can maintain network connectivity. Where the home channel conditions prompted the channel switch (current home channel conditions were bad), the clients can remain on the home channel while the isolated radio chain scans the preferred channel (from the ranked channel list) for the requisite (CAC) amount of time. If the home channel conditions are satisfactory, and radar signals are detected, the isolated radio chain can scan the preferred channel (from the ranked channel list) while the clients of the radio are temporarily transitioned to a preferred non-DFS channel.

Hardware processor 402 may execute instruction 412 to scan the alternative channel using the isolated radio chain to detect the presence of radar signals on the alternative channel. Hardware processor 402 may execute instruction 414 to transition the radio to the alternative channel if no radar signals are detected. Detection of radar using the isolated radio chain can occur when the required channel switch is a result of bad channel conditions, or when channel conditions are at least satisfactory, but radar is detected on the channel, where that channel is the radio's home channel, the use of the isolated radio chain occurs after the clients of the radio have (temporarily, for the moment) been migrated to a non-DFS alternative channel.

Figure 5:
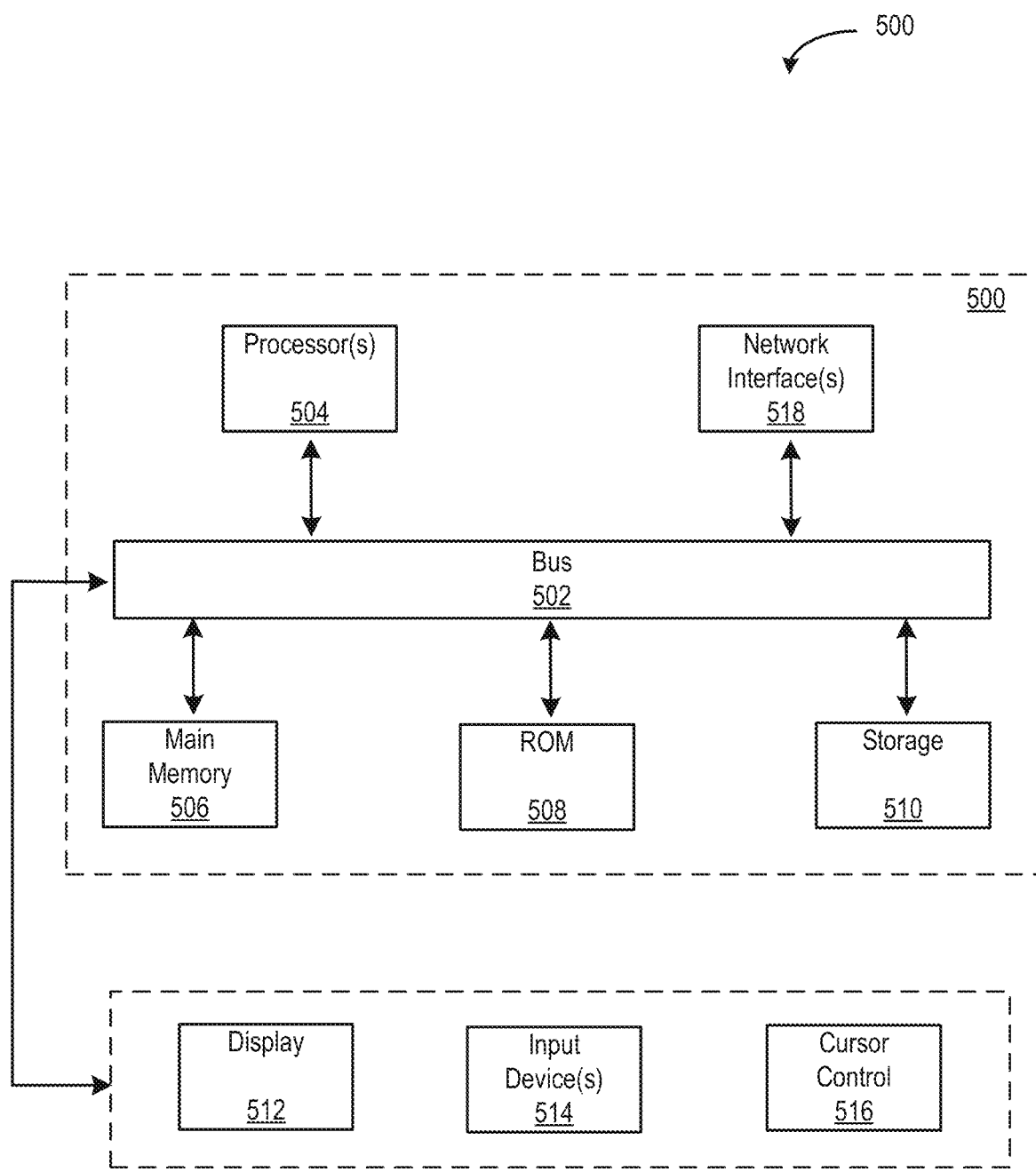
FIG. 5 depicts a block diagram of an example computer system in which various of the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP), comprising:
   at least one radio;
   a processor; and
   a memory unit operatively connected to the processor, the memory unit including instructions that when executed, cause the processor to:
      determine when a channel switch from a current channel on which the at least one radio is set to operate to an alternative channel is required;
      determine a type of alternative channel to which the at least one radio is to be switched;
      convert the AP to a multi-radio mode of operation that includes an isolated radio chain when the determined type of alternative channel is a dynamic frequency selection (DFS) channel;
      scan the alternative channel using the isolated chain of the at least one radio to detect radar signals present thereon; and
      transition the at least one radio to the alternative channel when no radar signals are detected.

2. The AP of claim 1, wherein the instructions that when executed cause the processor to determine a type of alternative channel to which the radio is to be switched causes the processor to determine whether the alternative channel comprises a DFS channel or a non-DFS channel.

3. The AP of claim 1, wherein the instructions that when executed cause the processor to determine when a channel switch from the current home channel to the alternative channel is required causes the processor to determine when the utilization of the current home channel is worsening, and when the alternative channel has lower utilization than the current home channel.

4. The AP of claim 3, wherein the at least one radio comprises an 8 chain 5 GHz radio convertible at run-time to two 5 GHz radios each operating with 4 chains each.

5. The AP of claim 3, wherein the at least one radio comprises n chains convertible at run-time to two or more subsets of the n chains.

6. The AP of claim 5, wherein the instructions that when executed cause the processor to scan the alternative channel further cause the processor to the scan the alternative channel for a period of time commensurate with a Channel Availability Check (CAC)—specified duration.

7. The AP of claim 5, wherein the memory unit includes further instructions that when executed cause the processor to operate the at least one radio as the two or more subsets of the n chains, and to dedicate a chain of at least one of the two or more subsets of the n chains to operate as the isolated chain.

8. The AP of claim 5, wherein the memory unit includes further instructions that when executed cause the processor to operate the radio as a single n chain radio, and to dedicate a chain of the single n chain radio to operate as the isolated chain.

9. The AP of claim 1, wherein the instructions that when executed cause the processor to determine when a channel switch from the current home channel to the alternative channel is required causes the processor to determine when radar signals are detected on the current home channel, and the alternative channel comprises a DFS channel.

10. The AP of claim 9, wherein the memory includes instructions that when executed further cause the processor to temporarily transition to a highest-ranked non-DFS alternative channel to allow for the transition of the at least one radio to the isolated chain mode of operation and the allow for the scanning of the alternative DFS channel.

11. The AP of claim 1, wherein the memory includes instructions that when executed further cause the processor to periodically scan potential alternative channels and rank the potential alternative channels based on utilization.

12. The AP of claim 1, wherein the current channel comprises a specified home channel on which the at least one radio is configured to provide client connectivity.

13. The AP of claim 1, wherein the memory unit includes instructions that when executed further cause the processor to, in response to a determination that the type of alternative channel is a non-DFS channel, transmit a Channel Switch Announcement (CSA) information element (IE) to clients currently associated with the AP.

14. The AP of claim 13, wherein the memory unit includes instructions that when executed further cause the processor to migrate the AP to the non-DFS channel.

15. An access point (AP), comprising:
   at least one radio;
   a processor; and
   a memory unit operatively connected to the processor, the memory unit including instructions that when executed, cause the processor to:
      periodically scan foreign channels while the at least one radio is set to operate on a home channel;
      create a ranked list of the foreign channels based on utilization of each of the foreign channels;
      determine utilization of the home channel;
      in response to a determination that the utilization of the home channel is such that the at least one radio should transition to an alternative channel or the home channel is a Dynamic Frequency Selection (DFS) channel, select a highest ranked foreign channel of the ranked list to which the at least radio is to migrate; and
      one of transition to the highest ranked foreign channel when the highest ranked foreign channel is a non-DFS channel, or transition to a next-highest ranked non-DFS foreign channel temporarily maintaining current client connectivity to a network through the at least one radio when the highest ranked foreign channel is a DFS channel.

16. The AP of claim 15, wherein the instructions that when executed causes the processor to transition to the next-highest ranked non-DFS foreign channel, comprises instructions that when executed further cause the processor to perform a Channel Availability Check (CAC) assessment on the highest ranked foreign channel that is a DFS channel, and wherein the memory unit includes instructions that when executed further cause the processor to transition to the highest ranked foreign channel that is a DFS channel in response to a successful CAC assessment.

17. The AP of claim 16, wherein the memory unit includes instructions that when executed further cause the processor to perform the CAC assessment with an isolated radio chain of the at least one radio, the at least one radio having been converted to or already operating in a multi-radio mode.

18. The AP of claim 15, wherein the determination that the utilization of the home channel is such that the at least one radio should transition to an alternative channel is made in response to instructions that when executed further cause the processor to determine when the utilization of the home channel comprises at least one of undesirably high noise floor and undesirably high channel interference.

19. The AP of claim 15, wherein the memory unit includes instructions that when executed further cause the processor to check for radar signal presence on the home channel in response to the determination that the home channel comprises a DFS channel.

20. A method, comprising:
- determining when a channel switch from a current channel on which the at least one radio is set to operate to an alternative channel is required;
- determine a type of alternative channel to which the at least one radio is to be switched when the channel switch is required;
- in response to a determination that the type of alternative channel is a dynamic frequency selection (DFS) channel, convert the AP to a multi-radio mode of operation that includes an isolated radio chain;
- scan the alternative channel using the isolated chain of the at least one radio to detect radar signals present thereon; and
- transition the at least one radio to the alternative channel when no radar signals are detected.

\* \* \* \* \*